Patented June 30, 1925.

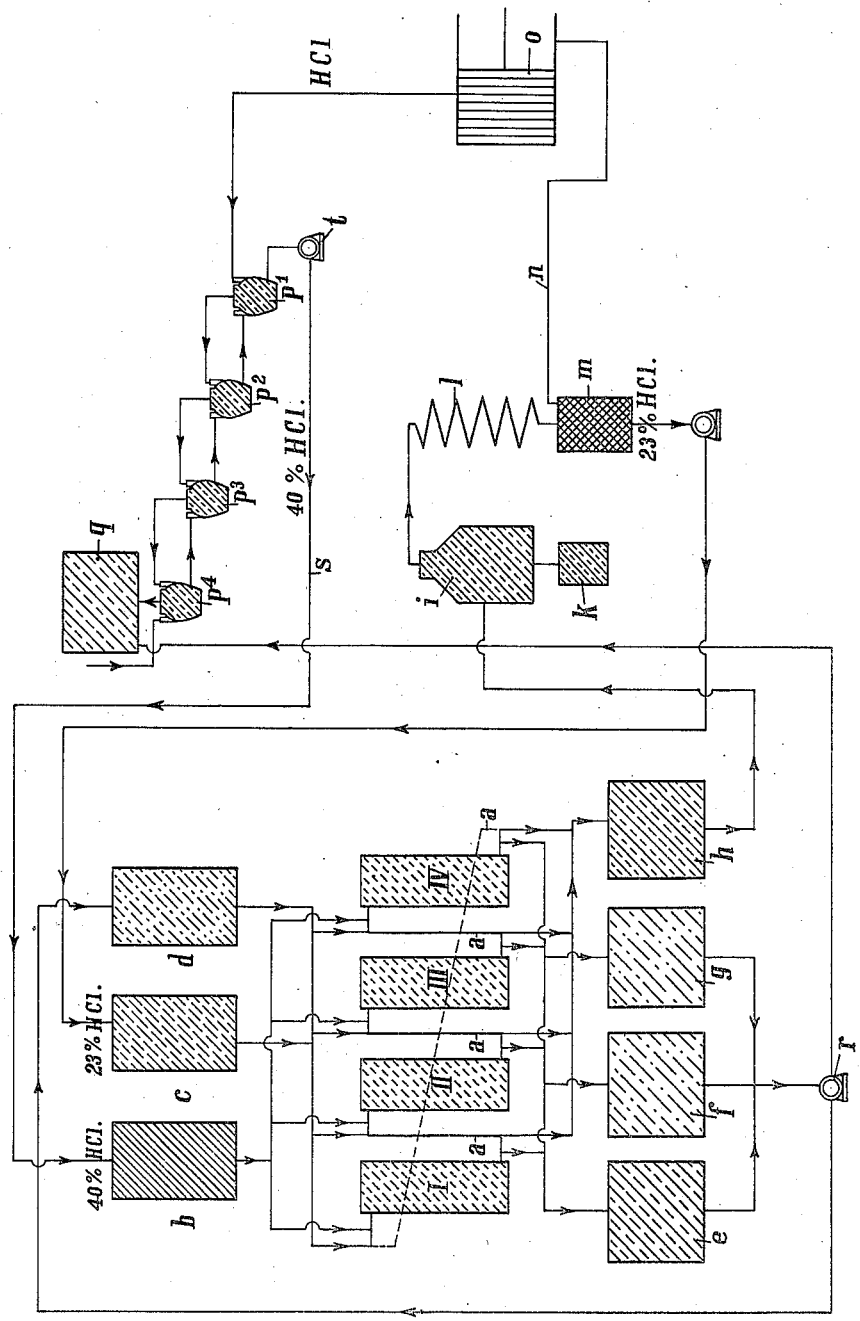

1,544,149

UNITED STATES PATENT OFFICE.

ERIK HÄGGLUND, OF HEIDELBERG, GERMANY, ASSIGNOR TO THE FIRM OF TH. GOLDSCHMIDT A.-G., OF ESSEN, GERMANY.

PROCESS AND PLANT FOR MANUFACTURING CARBOHYDRATES FROM VEGETABLE MATTER.

Application filed August 30, 1921. Serial No. 496,952.

*To all whom it may concern:*

Be it known that I, ERIK HÄGGLUND, a citizen of the Kingdom of Sweden, residing at the time at Heidelberg, Germany, P. O. address Abo, Finland, have invented certain new and useful Improvements in Processes and Plants for Manufacturing Carbohydrates from Vegetable Matter, of which the following is a specification.

This invention relates to a process of manufacturing carbohydrates, particularly sugar, from vegetable matter, preferably wood in the state of fine division such as saw dust, by treating such vegetable matter with solutions of highly concentrated hydrochloric acid. The invention consists in a special manner of carrying through such known process and in a plant adapted therefor whereby high economy in the use of acid for dissolving the wood and of fuel for distilling the sugar solution is secured.

A diagram of a plant suitable for carrying out the process in a continuous and cyclical manner is shown on the annexed drawing.

The numerals I, II, III, IV designate four vessels or digesters for treating saw dust or other suitable vegetable matter with hydrochloric acid solution for the purpose of dissolving cellulose so as to form a solution containing carbohydrates and hydrochloric acid. The digesters I—IV are connected with each other by conduits, $a$, conveying liquid from the bottom of each digester to the top of the succeeding digester. $b$, $c$, $d$, are three tanks the one $b$ for receiving a solution highly concentrated in hydrochloric acid preferably of a concentration of about 40% or more, the second $c$ for receiving a hydrochloric acid solution of minor concentration for instance 23% and the third $d$ for receiving water. The tanks $b$, $c$, $d$ are connected with each of the digesters I to IV by conduits indicated on the drawing by lines with arrows indicating the direction of flow through the conduits. The letters $e$, $f$, $g$, $h$ designate four receptacles provided for receiving liquor coming from digesters I to IV. The purpose of receptacle $e$ is to receive the acid of minor concentration passing from tank $c$ through one of the digesters I to IV. Receptacles $f$ and $g$ are provided to receive water from tank $d$ after it has been used to wash out exhausted material in digesters I to IV. Receptacle $h$ is for the storage of the solution of carbohydrates formed by the acid treatment of the wood in digesters I to IV wherein the conversion of the carbohydrates formed by the dissolving of cellulose material into sugar is completed.

Reference letters, $i$, $k$, $l$, $m$, $n$, $o$ designate elements of a distilling plant for the sugar solution collected in receptacle $h$. $i$ is the distilling vessel, $k$ a vessel for receiving the sugar freed from acid, $l$ is a condensation coil, $m$ a vessel for receiving condensed diluted acid which under preferred working conditions is obtained in a degree of concentration of about 23%; $n$ is a conduit leading to the suction side of a vacuum pump $o$ which delivers the hydrochloric acid gas resulting from the distillation of the sugar solution to an acid condensation plant $p^1$, $p^2$, $p^3$, $p^4$, $q$. In this plant the vessel $q$ is fed with diluted hydrochloric acid from receptacle $e$ by pump $r$. Such diluted acid is enriched in hydrochloric acid by conducting it successively through jars $p^4$ to $p^1$ where it is brought into contact with the hydrochloric acid gas coming from the vacuum pump. The diluted hydrochloric acid liquid is brought to the degree of concentration in hydrochloric acid required for effectively dissolving cellulose material preferably 40% or more, and transported through conduit $s$ by pump $t$ to tank $b$.

The operation of the cellulose dissolving plant proper is as follows assuming that the plant is under normal working conditions: Three of the four digesters for instance digesters I to III are filled with saw dust in different stages of extraction, digester I containing undissolved residuum rich in lignine, digester II containing besides the insoluble residuum a portion of the carbohydrates present in the saw dust forming the raw material, and digester III containing the saw dust in substantially unchanged condition. Digester IV is cut out for being emptied and refilled. Concentrated acid from the tank $b$ is introduced into digester I displacing the liquid content thereof into digester II, the liquid thus introduced into digester II in turn displacing the liquid content thereof into digester III, the liquid content of digester III being replaced thereby and forced into receptacle h.

When the refilling of digester IV is completed a small portion of the concentrated acid solution is introduced into digester I from tank b forming a protective layer therein whereafter diluted acid from tank c is introduced into said digester I to such extent, that the whole liquid contained therein is driven through conduit a into digester II and the liquid filling of this digester is driven into digester III and the filling of digester III is driven into digester IV which contains fresh saw dust. Digester I is now cut out and the diluted acid contained therein emptied into receptacle e, whereby the carbohydrates still contained in said digester are leached out. In order to complete the leaching out of the exhausted saw dust in digester I water from tank d is run through the digester preferably in two stages the water of the two stages being delivered in succession to receptacles f and g.

While digester I is prepared for being emptied and refilled fresh concentrated acid solution from tank b is introduced into digester II with the effect of emptying digester IV from the concentrated solution of carbohydrates contained therein.

In the same way the several digesters are successively cut out and while one digester is cut out a further digester is emptied from its carbohydrates solution and a third digester filled with fresh concentrated acid solution.

It appears from the foregoing that hydrochloric acid solution which contains carbohydrates formed by treating cellulose material is brought into contact with cellulose material in a state of minor exhaustion and finally with quite fresh vegetable matter, that is saw dust.

This procedure is of high importance in the economy of the process. It has been found that a hydrochloric acid solution containing carbohydrates is capable of dissolving further quantities of carbohydrates. For instance, if a highly concentrated hydrochloric acid solution is caused to react upon saw dust at a temperature of 10° C. for from 6 to 12 hours it will contain for example, 10 units by weight of carbohydrates and 43 units by weight of hydrochloric acid in 100 units of solution. If this solution is caused to react in the same way with fresh vegetable matter a solution is formed containing for example, 15 units by weight of carbohydrates and 42 units of hydrochloric acid. Thus by each successive treatment the sugar content of the solution is increased and the hydrochloric acid content reduced. The following table illustrates the sugar and hydrochloric acid content of a solution after successive treatments.

18 parts sugar, 40 parts hydrochloric acid.

23 parts sugar, 38.5 parts hydrochloric acid.

28 parts sugar, 34 parts hydrochloric acid.

The cellulose dissolving power of the solution however diminishes with each successive treatment, but it has been found that by introducing fresh hydrochloric acid gas into a hydrochloric acid solution of carbohydrates the power of such solution of dissolving carbohydrates is increased. For instance in the last named solution containing in a volume of 100 units 28 parts in weight of sugar and 34 parts of hydrochloric acid 6 units of hydrochloric acid gas were introduced and such solution was again brought into reaction with successive portions of fresh vegetable matter. The successive solutions formed by such reaction contained:

35 parts sugar and 30 parts hydrochloric acid.

40 parts sugar and 27 parts hydrochloric acid.

45 parts sugar and 23.5 parts hydrochloric acid.

50 parts sugar and 21 parts hydrochloric acid.

It appears from the above that the step of introducing fresh hydrochloric acid gas into a hydrochloric acid solution of sugar is of high value in securing solutions very rich in sugar and poor in hydrochloric acid.

The step of introducing hydrochloric acid gas into solutions formed in operating the plant illustrated on the drawing has not been indicated on the drawing. Of course, the introduction of this step requires suitable augmentation of the number of digesters through which the reaction liquid is to be conducted.

It is essential for the economy of the process of manufacturing sugar solutions from vegetable matter by dissolving cellulose in hydrochloric acid solution that the hydrochloric acid be recovered as completely as possible and in a state of concentration as high as possible. The plant diagrammatically indicated on the drawing provides for the recovery of hydrochloric acid by distilling the formed sugar solution under vacuum. In addition thereto some hydrochloric acid in the form of hydrochloric acid gas can be recovered by introducing air into a digester, wherein hydrochloric acid has been brought to reaction with vegetable matter. The reaction process in the several digesters can be carried through by introducing hydrochloric acid solution and gaseous hydrochloric acid into the digester and after reaction blowing air through the digester whereby hydrochloric acid gas is blown out, the resulting mixture of air and hydrochloric acid gas being delivered into another digester in which vegetable matter is being treated with hydrochloric acid solution.

What I claim is:

1. Process of manufacturing carbohydrates which comprises reacting successively upon each of a series of batches of cellulosic vegetable matter of progressively decreasing degree of decomposition with a batch of a solution of hydrochloric acid containing initially not less than about 39% by weight of hydrochloric acid, recovering hydrochloric acid gas and a relatively dilute solution of hydrochloric acid from the resulting liquid reaction products, leaching the undissolved residue of the first of said series of batches of cellulosic vegetable matter with a relatively dilute solution of hydrochloric acid, absorbing said hydrochloric acid gas in the resulting leach liquor whereby a solution containing not less than about 39% by weight of hydrochloric acid is produced, using said last named solution of hydrochloric acid in a succeeding cycle of the process, and using said relatively dilute solution of hydrochloric acid recovered from the liquid reaction products for leaching the undissolved residue of a batch of cellulosic vegetable matter in a succeeding cycle of the process.

2. Process of manufacturing carbohydrates which comprises reacting upon cellulosic vegetable matter with a solution of hydrochloric acid containing not less than about 39% by weight of hydrochloric acid, separating the liquid reaction products from the undissolved cellulosic vegetable matter by replacement with a relatively dilute solution of hydrochloric acid substantially free of carbohydrates, and preventing the mixing of said liquid reaction products and said relatively dilute solution of hydrochloric acid by providing an intervening strata of hydrochloric acid containing not less than about 39% by weight of hydrochloric acid.

3. Process of manufacturing carbohydrates which comprises reacting upon cellulosic vegetable matter with a solution of hydrochloric acid containing not less than about 39% by weight of hydrochloric acid, separating the resulting solution of carbohydrates from undissolved residue, leaching said residue with a solution of hydrochloric acid containing substantially less than 39% by weight of hydrochloric acid, dissolving hydrochloric acid gas in the resulting leach liquor, and using the resulting solution for reacting upon a further quantity of cellulosic vegetable matter.

In testimony whereof I affix my signature in presence of two witnesses.

ERIK HÄGGLUND.

Witnesses:
 HANS RAPATT,
 KARL SAUR.